Dec. 5, 1950 — C. A. STEEN — 2,533,063
ELECTRIC STEAM HEATING DEVICE
Filed March 14, 1947
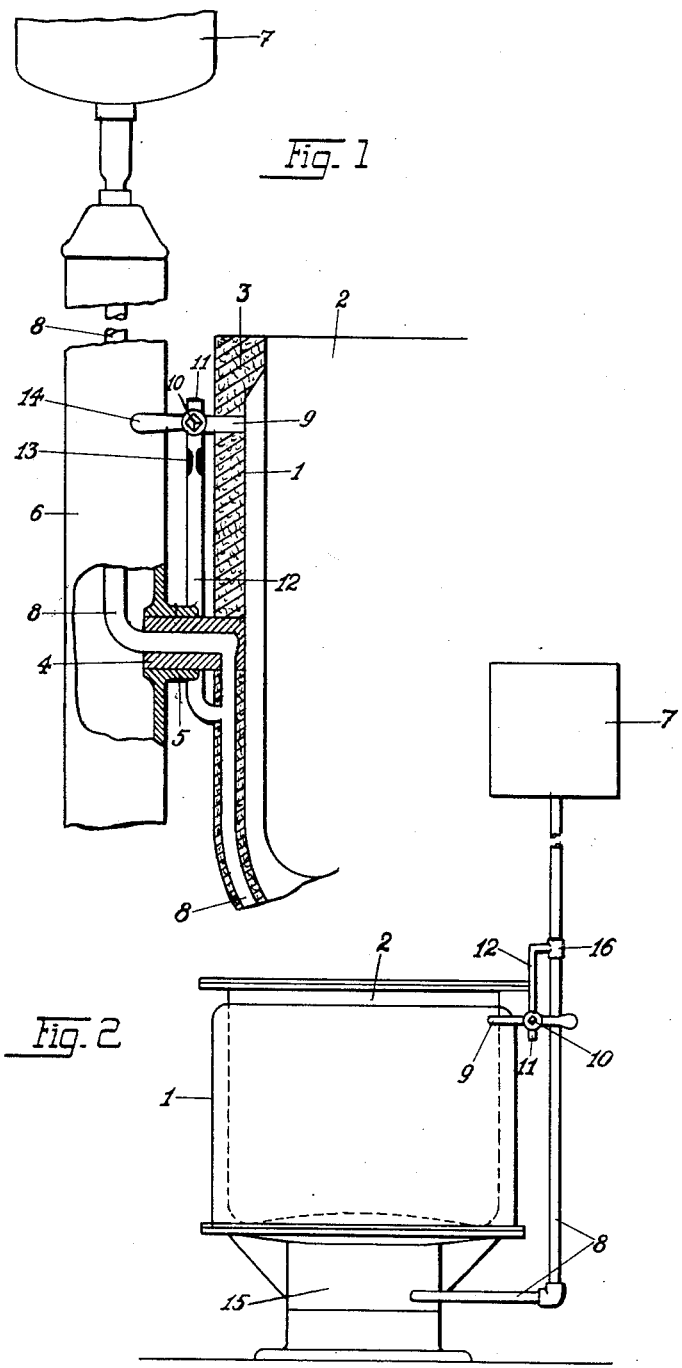

UNITED STATES PATENT OFFICE 2,533,063

ELECTRIC STEAM HEATING DEVICE

Carl August Steen, Getinge, Sweden

Application March 14, 1947, Serial No. 734,813
In Sweden August 23, 1943

6 Claims. (Cl. 219—40)

The invention refers to an electric steam heating device, such as a boiling pan. If electric devices of this kind are provided with an expansion vessel, into which the water may be forced from the steam generating chamber by the steam pressure, an electric spark may be formed between the electrodes and the descending water, so that explosive oxyhydrogen gas is obtained and may be caused to detonate by the electric sparks.

It is a main object of the invention to prevent such a detonation by ventilation of the steam space.

Another object is to efficiently remove air and oxyhydrogen gas continuously during the working of the device and with only a little loss of steam or heat.

A further object is to utilize the escape of steam for compensation of heat losses of the expansion vessel and the ascending pipe between said vessel and the steam generating chamber.

Other objects will appear from the following specification and the accompanying drawing, in which:

Fig. 1 is an elevation, partly in section, of an embodiment of the invention.

Fig. 2 is an elevation of another embodiment.

On the drawing 1 represents the outer casing and 2 the inner casing or heat transmitting wall of a boiling pan having an insulating outer layer 3. According to Fig. 1 the pan is tiltingly mounted by two pivots 4 in bearings 5 provided in columns 6, of which only one is shown on the drawing. This column also serves as a support for an expansion vessel 7 communicating at the top with the open air and by means of an ascending pipe 8 with the lowest part of the steam generating chamber containing electrodes and located at the bottom of the steam space (not shown). The pipe passes through the column 6, the pivot 4 and the insulating outer casing 3.

This steam space is at its upper part connected by a short pipe 9 with a three-way valve 10 having only two valve positions, in which the pipe 9 communicates either through an opening 11 with the open air or by a connection pipe 12 with the ascending pipe below the pivot 4. The connection pipe 12 is at 13 provided with a reduced flow area. By a handle 14 the valve can be operated, but the pipe 9 can never be closed by the valve.

After starting the pan by switching on the electric current and as soon as steam generation begins, the enclosed air and the oxyhydrogen gas, as soon as it is found, are displaced to the upper part of the steam space and further through the pipe 9 and the opening 11 to the open air. As soon as most of the air in this way has escaped, the position of the valve is changed, and a very reduced flow of steam, air and oxyhydrogen gas pass then to and through the ascending pipe 8, in which the steam condenses and the water flows back to the steam generating chamber, whereas the gases pass on to the air. If thereafter water is forced by the steam pressure into the ascending pipe 8 and expansion vessel 7 this will not prevent the flow of gases into the pipe 8. By the reduced area at 13 only so much steam is allowed to escape as is necessary for carrying off the oxyhydrogen gas, and this steam aids to keep the water in the expansion vessel hot, so that the water, when the steam pressure is reduced and the water flows back into the steam generating chamber, has a temperature near the boiling point. It is obvious that the pan also may be started with the valve in the position for continuous working.

In Fig. 2 a fixed boiling pan is shown, and the same figures refer to corresponding parts as in Fig. 1. The steam generating chamber 15 is connected with the expansion vessel 7 by the ascending pipe 8 at a point located above the valve. This point may be chosen in dependence of the height of ascending pipe, the diameter thereof and other for the condensation of the steam essential elements.

Although the embodiments shown refer to boiling pans it is obvious that the invention may be used also for other kinds of heating apparatus, such as boilers and water heaters.

I claim:

1. In an electric steam heating device, a steam generator comprising walls forming a container to be heated by steam, walls forming a jacket for said container and providing, together with a wall of the container, a water space and a steam space, the wall of the container which partly serves for providing the steam space being a heat transmitting wall, electrodes in said water space for current passing through the water, an expansion vessel located above said container communicating by an ascending pipe with the lowest portion of said water space and by an opening with the open air, and a connection pipe between the upper part of said steam space and said ascending pipe.

2. In an electric steam heating device, a steam generator comprising walls forming a container to be heated by steam, walls forming a jacket for said container and providing, together with a wall of the container, a water space and a steam space, the wall of the container which partly serves for providing the steam space being a heat transmitting wall, electrodes in said water space for current passing through the water, an expansion vessel located above said container communicating by an ascending pipe with the lowest portion of said water space and by an opening with the open air, and a connection pipe between the upper part of said steam space and said ascending pipe at a sufficient low point to allow most of the escaping steam to condensate in the ascending pipe and the expansion vessel.

3. In an electric steam heating device, a steam generator comprising walls forming a container to be heated by steam, walls forming a jacket for said container and providing, together with a wall of the container, a water space and a steam space, the wall of the container which partly serves for providing the steam space being a heat transmitting wall, electrodes in said water space for current passing through the water, an expansion vessel located above said container communicating by an ascending pipe with the lowest portion of said water space, and a connection pipe between said steam space and said ascending pipe, said connection pipe having such a reduced flow area that only an insignificant part of the generated steam passes through the same.

4. In an electric steam heating device, a steam generator comprising walls forming a container to be heated by steam, walls forming a jacket for said container and providing, together with a wall of the container, a water space and a steam space, the wall of the container which partly serves for providing the steam space being a heat transmitting wall, electrodes in said water space for current passing through the water, an expansion vessel located above said container communicating by an ascending pipe with the lowest portion of said water space, and a connection pipe between said steam space and said ascending pipe, said connection pipe having a valve for connecting the steam space alternately with the ascending pipe and the open air.

5. In an electric steam heating boiling pan, a steam generator comprising a water space and a steam space formed between an outer and an inner casing of the pan, said outer casing having pivots journalled in bearings in fixed columns, electrodes in said water space for current passing through the water, an expansion vessel supported by one of said columns and communicating by an ascending pipe with the lowest portion of said steam water space, said ascending pipe passing through one of said pivots, and a connection pipe between said steam space and said ascending pipe at a point between said water space and said pivot.

6. A boiling pan according to claim 5, and provided with an always open three-way valve in said connection pipe to allow the steam to escape alternately to the open air and to the ascending pipe.

CARL AUGUST STEEN.

REFERENCES CITED

The following references are of record in the file of this patent:

UNITED STATES PATENTS

| Number | Name | Date |
|---|---|---|
| Re. 16,935 | Noll | Apr. 17, 1928 |
| 1,504,928 | Bergeon | Aug. 12, 1924 |
| 1,522,474 | Horstkotte | Jan. 6, 1925 |
| 1,887,533 | Williams | Nov. 15, 1932 |
| 2,185,786 | Eaton | Jan. 2, 1940 |
| 2,322,118 | Ellis | June 15, 1943 |